United States Patent
Schmitt et al.

(10) Patent No.: US 9,442,000 B2
(45) Date of Patent: Sep. 13, 2016

(54) METHOD FOR ASCERTAINING AND MONITORING FILL LEVEL OF A MEDIUM IN A CONTAINER BY MEANS OF A FILL-LEVEL MEASURING DEVICE USING A TRAVEL TIME MEASURING METHOD

(75) Inventors: Edgar Schmitt, Friesenheim (DE); Dietmar Spanke, Steinen (DE); Alexey Malinovskiy, Maulburg (DE); Stefan Gorenflo, Haussen (DE); Klaus Feisst, Stegen (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 419 days.

(21) Appl. No.: 13/879,102

(22) PCT Filed: Aug. 29, 2011

(86) PCT No.: PCT/EP2011/064774
§ 371 (c)(1),
(2), (4) Date: Apr. 12, 2013

(87) PCT Pub. No.: WO2012/048938
PCT Pub. Date: Apr. 19, 2012

(65) Prior Publication Data
US 2013/0207836 A1   Aug. 15, 2013

(30) Foreign Application Priority Data

Oct. 15, 2010   (DE) .......................... 10 2010 042 525

(51) Int. Cl.
*G01F 23/284* (2006.01)
*G01F 23/296* (2006.01)

(52) U.S. Cl.
CPC ......... *G01F 23/2845* (2013.01); *G01F 23/284* (2013.01); *G01F 23/2961* (2013.01); *G01F 23/2962* (2013.01)

(58) Field of Classification Search
CPC ............. G01F 23/284; G01F 23/2845; G01F 23/296; G01F 23/2962
See application file for complete search history.

(56) References Cited

U.S. PATENT DOCUMENTS 3,884,074 A * 5/1975 Robertsson ......... G01F 23/2962
                                                           73/290 V
4,821,569 A * 4/1989 Soltz ........................... 73/290 V (Continued)

FOREIGN PATENT DOCUMENTS

DE         43 08 373 A1    9/1994
DE   10 2004 051 999 A1    4/2006

(Continued)

OTHER PUBLICATIONS

German Search Report dated Aug. 4, 2011, issued in Application No. 10 2010 042 525.7, in Munich, Germany.

(Continued)

*Primary Examiner* — Matthew M Barker
(74) *Attorney, Agent, or Firm* — Bacon & Thomas, PLLC

(57) ABSTRACT

A method for ascertaining and monitoring fill level of a medium in a container using a travel time measuring method, wherein transmission signals are transmitted toward the medium and reflection signals are received. The received reflection signals are registered as echo signals in an echo function dependent on travel time. Based on known measuring device- and container-specific reflection planes, possible reflection regions in the echo function are calculated by means of an evaluation algorithm. In the calculated reflection regions, the disturbance echo signals and/or the multi-echo signals in the echo function are classified, wherein non-classified reflection signals are ascertained and checked as wanted echo signals by means of a search algorithm, wherein, from a position and/or an amplitude of at least one wanted echo signal, fill level is determined, and wherein the measured value of fill level is output.

8 Claims, 3 Drawing Sheets

(56) References Cited

U.S. PATENT DOCUMENTS

| | | | |
|---|---|---|---|
| 5,157,639 A * | 10/1992 | Leszczynski | 367/99 |
| 5,587,969 A * | 12/1996 | Kroemer et al. | 367/99 |
| 6,810,342 B1 | 10/2004 | Gulden et al. | |
| 6,877,372 B2 * | 4/2005 | Spanke et al. | 73/290 V |
| 6,895,814 B2 * | 5/2005 | Benz | 73/290 V |
| 7,333,900 B2 * | 2/2008 | Welle et al. | 702/55 |
| 7,730,760 B2 * | 6/2010 | Schroth et al. | 73/1.73 |
| 7,747,397 B2 * | 6/2010 | Welle et al. | 702/55 |
| 7,819,002 B2 * | 10/2010 | Spanke et al. | 73/290 V |
| 7,966,141 B2 * | 6/2011 | Spanke et al. | 702/85 |
| 8,159,386 B2 * | 4/2012 | Malinovskiy et al. | 342/124 |
| 8,276,444 B2 * | 10/2012 | Malinovskiy et al. | 73/290 V |
| 8,380,449 B2 * | 2/2013 | Welle | 702/55 |
| 8,495,913 B2 * | 7/2013 | Partington | G01F 23/2962 73/290 V |
| 2008/0297159 A1 * | 12/2008 | Mehdizadeh | G01F 23/284 324/333 |
| 2011/0094299 A1 | 4/2011 | Muller et al. | |
| 2011/0166805 A1 | 7/2011 | Hammer et al. | |
| 2011/0238352 A1 | 9/2011 | Griessbaum et al. | |

FOREIGN PATENT DOCUMENTS

| | | |
|---|---|---|
| DE | 10 2007 042 042 A1 | 3/2009 |
| EP | 2 372 318 A1 | 5/2011 |
| WO | 03/016835 A1 | 2/2003 |

OTHER PUBLICATIONS

International Preliminary Report on Patentability dated Nov. 16, 2011, issued in Application No. PCT/EP2011/064774, in Rijswijk, the Netherlands.

International Preliminary Report on Patentability dated Apr. 25, 2013, issued in Application No. PCT/EP2011/064774 in Geneva, Switzerland.

* cited by examiner

METHOD FOR ASCERTAINING AND MONITORING FILL LEVEL OF A MEDIUM IN A CONTAINER BY MEANS OF A FILL-LEVEL MEASURING DEVICE USING A TRAVEL TIME MEASURING METHOD

TECHNICAL FIELD

The present invention relates to a method for ascertaining and monitoring fill level of a medium in a container using a travel time measuring method.

BACKGROUND DISCUSSION

Such methods for ascertaining and monitoring fill level in a container are frequently applied in measuring devices of automation- and process control technology. Produced and sold by the assignee, for example, are such fill level measuring devices under the marks, Prosonic, Leveiflex and Micropilot, which work using the travel-time measuring method and serve to determine and/or to monitor fill level of a medium in a container. These fill level measuring devices transmit a periodic transmission signal in the microwaves- or ultrasonic range by means of a transmitting/receiving element in the direction of the surface of a fill substance and receive the reflected echo signals after a distance dependent, travel time. Usual fill level measuring devices working with microwaves can be divided basically into two classes; a first class, in the case of which the microwaves are sent by means of an antenna toward the fill substance, reflected on the surface of the fill substance and then received back after a distance dependent, travel time and a second class, in the case of which the microwaves are led along a waveguide toward the fill substance, reflected on the surface of the fill substance due to the impedance jump existing there and the reflected waves led back along the waveguide.

Formed from the received echo signals, as a rule, is an echo function representing echo amplitude as a function of travel time, wherein each value of this echo function corresponds to the amplitude of an echo reflected at a certain distance from the transmitting element.

In this ascertained echo function, a wanted echo is determined, which corresponds to the reflection of the transmission signal on the surface of the fill substance. From the travel time of the wanted echo, there results in the case of known propagation velocity of the transmission signals directly the separation between the surface of the fill substance and the transmitting element.

In order to simplify the echo curve evaluation, not the received, raw signal of the pulse sequences is used, but, instead, their envelope, the so called envelope curve, is ascertained. The envelope curve is won, for example, by rectifying the raw signal of the pulse sequences and then filtering through a lowpass filter.

There are a number of different method aspects for determining the wanted echo in an envelope curve, and these can be divided into two basic methods, namely the static detection methods with static echo search algorithms and/or the dynamic detection methods with dynamic echo search algorithms, for example, by applying historical information.

In a first method aspect, using a static echo search method, a static echo search algorithm selects the wanted echo as that which has a larger amplitude than the remaining echoes. Thus, the echo in the envelope curve with the largest amplitude is selected as wanted echo.

In a second method aspect, using a static echo search method, it is assumed by a static echo search algorithm that the wanted echo is the echo occurring first in the envelope curve after the transmission pulse. Thus, the first echo in the envelope curve is selected as wanted echo.

It is possible to combine the two method aspects with one another in a static echo search algorithm by e.g. defining a so-called first echo factor. The first echo factor is a predetermined factor, by which an echo must exceed a certain amplitude, in order to be recognized as a wanted echo. Alternatively, a travel time dependent, echo threshold can be defined, which an echo must exceed, in order to be recognized as wanted echo.

In a third method aspect, the fill-level measuring device is told, one time, the current fill level. The fill-level measuring device can, based on the specified fill level, identify the associated echo as wanted echo and follow such e.g. by a suitable dynamic echo search algorithm. Such methods are referred to as echo tracking. In such case, e.g. in each measuring cycle, maxima of the echo signal or the echo function are determined and, due to the knowledge of the fill level ascertained in the preceding measuring cycle and an application-specific, maximum to be expected rate of change of fill level, the wanted echo is ascertained. From travel time of the so ascertained current wanted echo, there results then the new fill level.

An expanded method for monitoring the rate of change is described approximately in DE 198 245 267 A1, wherein, for individual echoes, a velocity measure is determined, which represents the change of the distance measures of two echoes evoked by the same object as a function of time. The velocity measures of various individual echoes are compared with one another and the result of the comparison is taken into consideration for an echo evaluation. Especially, an individual echo is evaluated with high probability to be a multiecho, when its velocity measure is displayable as a sum of weighted velocity measures of individual echoes with a smaller distance measure.

A fourth method is described in DE 102 60 962 A1. There, the wanted echo is ascertained based on data stored earlier in a memory. In such case, there are derived, from received echo signals, echo functions, which reflect the amplitudes of the echo signals as a function of their travel time. The echo functions are stored in a table, wherein each column serves for accommodating, in each case, one echo function. The echo functions are stored in the columns in a sequence, which correspond to the fill levels associated with the respective echo functions. In operation, the wanted echo and the associated fill level are determined based on the echo function of the current transmission signal with the assistance of the table.

In DE 103 60 710 A1, a fifth method is described, in the case of which periodically transmission signals are sent toward the fill substance, their echo signals recorded and converted into an echo function, at least one echo characteristic of the echo function determined, and, based on the echo characteristics of at least one preceding measurement, a prediction derived for the echo characteristics to be expected in the case of the current measurement. The echo characteristics of the current measurement are determined taking into consideration the prediction, and, based on the echo characteristics, the current fill level is ascertained. In the broadest sense, this method is like an echo tracking.

In DE 10 2004 052 110 A1, a sixth method is described, which achieves improvement of the wanted echo detection by an echo evaluation and classification of the echoes in the envelope curve.

These above described methods work, per se, without problem in a large number of applications. Problems occur, however, always when the echo coming from the fill level cannot be identified based on the method without there being some doubt as to the correctness of the identification due to multiechoes and disturbing echoes.

In the first method aspect, for example, measurement problems occur, in case installed objects present in the container reflect the transmission signals better than the surface of the fill substance.

In the case of the echo tracking according to the third method aspect, measurement problems occur, in case, during operation, the wanted echo runs over a disturbance echo and subsequently the disturbance echo is tracked further as a wrong wanted echo. Furthermore, there is a problem, in case, upon turn-on, the preceding wanted echo signal no longer agrees with the actual wanted echo signal or the preceding wanted echo signal is not known.

If, mistakenly, another echo than the fill-level echo is classified as wanted echo, there is the danger that a wrong fill level is output, without that such is noticed. This can, depending on application, lead to an overfilling of containers, to the running of pumps empty or to other events sometimes associated with considerable danger.

Due to the above described measurement problems, it can come to a wrong or unsettled measured value ascertainment of fill level of the medium in the container. A disturbance echo signal or a multiecho signal can be recognized as wanted echo signal. In the worst case, a so-called echo loss can be experienced, in the case of which the wanted echo signal can no longer be identified, or found.

SUMMARY OF THE INVENTION

An object of the invention is to provide a simpler, safer and improved method for ascertaining wanted echo signals in echo curves of travel-time measurement of measurement signals and for distinguishing wanted echo signals from disturbance echo signals and multiecho signals.

This object of the invention is achieved according to the invention by a method for ascertaining and monitoring fill level of a medium in a container by means of a fill-level measuring device using a travel time measuring method,
wherein transmission signals are transmitted toward the medium and reflection signals are received,
wherein the received reflection signals are registered as echo signals in an echo function dependent on travel time or travel distance,
wherein, based on measuring device- and container-specific reflection planes, possible reflection regions in the echo function are calculated by means of an evaluation algorithm,
wherein, based on the calculated reflection regions, disturbance echo signals and/or multiecho signals in the echo function are classified,
wherein non-classified reflection signals are ascertained and/or checked as wanted echo signals by means of a search algorithm,
wherein, from a position and/or an amplitude of at least one wanted echo signal, fill level is determined, and
wherein the measured value of fill level is output.

Advantageously, by means of the evaluation algorithm, at least one reflection position and/or at least one reflection amplitude of the possible reflection regions in the echo function are/is calculated.

In supplementation, the reflection positions of the reflection regions are determined by the evaluation algorithm by earlier calculating all possible reflections and transmissions of the transmission signals at the reflection planes.

In an embodiment, the reflection positions of the reflection regions are determined by the evaluation algorithm by registering distances of the measuring device- and container-specific reflection planes and calculating by addition of the distances of the reflection planes traveled through by the transmission signal.

In an additional embodiment, the reflection amplitudes of the reflection regions are determined by the evaluation algorithm by registering attenuation measures of the measuring device- and container-specific reflection planes and calculating by addition of the attenuation measures of the reflection planes traveled through by the transmission signal.

Alternatively, the distances and/or attenuation measures of the measuring device- and container-specific reflection planes are input as measuring device and/or container dependent variables into the evaluation algorithm or ascertained in a startup method and stored.

In an advantageous embodiment, a dynamic plausibility review is performed by means of the algorithm by comparing the ascertained reflection regions with the associated reflection amplitudes and the reflection positions at the measuring device- and container-specific reflection planes with the echo signals in the echo function.

Furthermore, for the dynamic plausibility review, the reflection amplitudes and/or reflection positions of a measuring device- and container-specific reflection plane are compared with a position and/or an amplitude of the echo signals.

A preferred embodiment provides that the received reflection signals are registered as echo signals in a measured echo function, or measured envelope curve, and that, based on measuring device- and container-specific reflection planes, possible reflection regions are registered by means of an evaluation algorithm with the calculated echo function, or the calculated envelope curves.

In a supplemental embodiment, the wanted echo signal 15 is ascertained by difference forming of the measured echo function 10a, or the measured envelope curve 11a, with the calculated echo function 10b, or the calculated envelope curves 11b.

In a related embodiment, by comparison of the measured echo function, or the measured envelope curve and the calculated echo function, or the calculated envelope curves, of disturbance reflections and/or multiple reflections, covered wanted echo signals, which do not appear as separate echo signals in the measured echo functions, or measured envelope curve, are ascertained.

BRIEF DESCRIPTION OF THE DRAWINGS

Other details, features and advantages of the subject matter the invention will become evident from the following description with associated drawing, in which preferred examples of embodiments of the invention are presented. In the examples of embodiments of the invention shown in the figures, elements, which correspond in their construction and/or in their function, are, for better perspicuity and for simplification, provided with equal reference characters. The figures of the drawing show as follows.

DETAILED DISCUSSION IN CONJUNCTION WITH THE DRAWINGS

Figure 1:
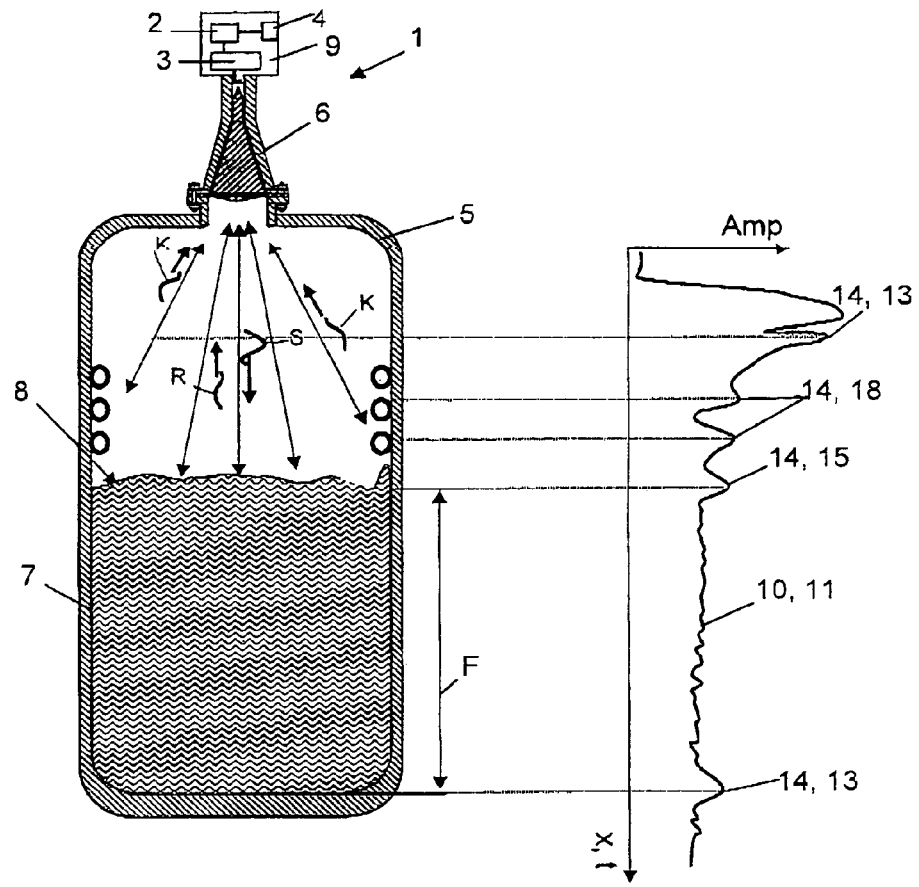
FIG. 1 is an example of an embodiment of a measuring device for ascertaining fill level, along with a corresponding echo function.

FIG. 1 shows a measuring device 1 working according to the travel-time measuring method for ascertaining fill level F of a medium 7. Measuring device 1 is mounted on a nozzle of a container 5. The illustrated measuring device 1 includes: a transmitting/receiving element 6 radiating freely into the process space; and a measurement transmitter 9. Measurement transmitter 9 includes at least one transmitting/receiving unit 3, which performs the producing and receiving of the measuring signals, a control/evaluation unit 4, which serves for signal processing of the measuring signals and for control of the measuring device 1, and a communication unit 2, which controls communication via a bus system as well as the energy supply of the measuring device 1. Integrated in the control/evaluation unit 4 is, for example, a memory element, in which the evaluation algorithm, the measurement parameters and echo parameters are stored. The transmitting/receiving element 6 is in this example of an embodiment, for example, a horn antenna, however, the transmitting/receiving element 6 can be any known form of antenna, such as e.g. a rod- or planar antenna, or it can be embodied as a waveguide in the case of application as a time-domain reflectometer. Produced in the transmitting/receiving unit 3 is a measurement signal, for example, in the form of a high-frequency transmission signal S, which is radiated via the transmitting/receiving element 6 with a predetermined radiation characteristic in the direction of medium 7. After a travel time t dependent on traveled distance x, the transmission signals S reflected on the interface 8 of the medium 7 as reflection signals R are received back by the transmitting/receiving element 6 and the transmitting/receiving unit 3. The control/evaluation unit 2 connected to the transmitting/receiving unit 3 ascertains from the reflection signals R an echo function 10, which displays the amplitudes of the echo signals 14 of the reflection signals R as a function of traveled distance x or the corresponding travel time t. Through an analog/digital conversion of the analog echo function 10, or the echo curve 10, a digitized envelope curve 11 is produced. In the following, only the concept of the echo function 10 will be used, wherein this concept likewise implies the terms, echo curve 10, envelope function, or envelope curve 11.

Also shown in FIG. 1 is an echo function 10 mapping the measuring situation in the container 5 as a function of travel distance x of the transmission signal S. For better understanding, reference lines are associated with the corresponding echo signals 18 in the echo function 10, so that cause and effect can be visually appreciated. Shown in the beginning region of the echo function 10 is the decay behavior, respectively the so-called ringing, which can arise due to multiple reflections or also from accretion formation in the transmitting/receiving element 6 or in the nozzle. Shown in the beginning region of the echo function is an echo signal 14, which is caused by the disturbance echo K of installed objects, such as stirring blades or supply pipes.

The method of the invention is not only applicable in freely radiating microwave measuring devices 1, as illustrated in FIG. 1, but, instead, can be used also in additional travel time measurement systems, such as, for example, TDR measuring devices or ultrasound measuring devices, and optical travel time measurement systems.

In today's state of the art, there are different approaches for identifying the wanted echo signal 15 and/or for determining the exact position x1 of the wanted echo signal 15 in the ascertained echo function 10 or the digital envelope curve 11. Dependent on the exact determining of the measured position of fill level F in the echo function 10 is the accuracy of measurement reachable with this echo measuring principle under the given measuring conditions in the container 5.

Figure 2:
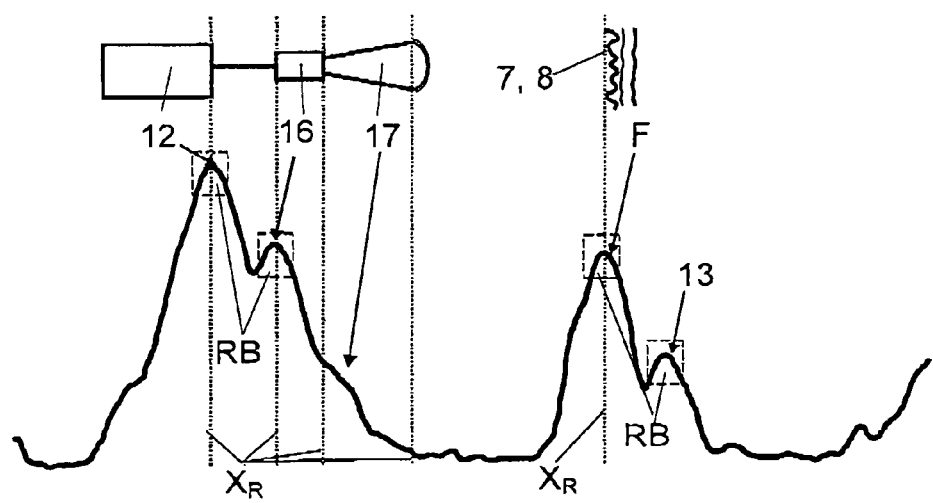
FIG. 2 is a symbolic measuring path of a fill-level measuring device with an echo function whose disturbance echo signals are associated with the individual reflection planes in the measuring path.
Figure 3:
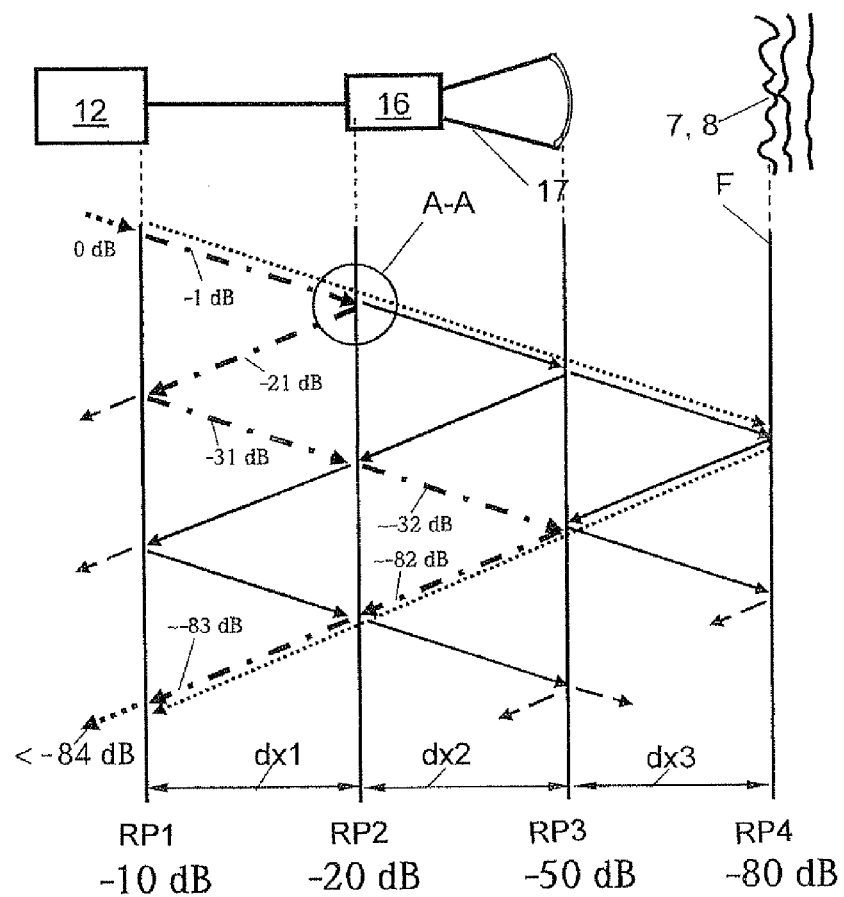
FIG. 3 is a symbolic measuring path of a fill-level measuring device of FIG. 2 with measuring path reflection planes, at which the transmission-and reflection possibilities of the signals are shown.

FIG. 2 shows a symbolic measuring path of a fill-level measuring device 1 with an echo function 10 whose disturbance echo signals 18 are associated with the individual reflection planes RP in the measuring path. In the electronics module, respectively in the high frequency module 12, in this example of an embodiment, a high-frequency pulse is produced and sent out as transmission signal S, most often, via a coaxial cable to the coupling means 16. In the coupling means, the transmission signal S is coupled from the coaxial conductor system and radiated into the antenna 17, respectively the horn. If the transmission signals S radiated from the antenna 17 strike a surface, respectively interface 8, of the medium 7, these transmission signals S are at least partially reflected back as reflection signals R. These reflection- and transmission possibilities of the transmission signal S at the reflection planes RP1, RP2, RP3, RP4 are illustrated in FIG. 3. Above all in the vicinity of the fill-level measuring device 1, there arise disturbing echoes 18 through reflections, for example, on impedance jumps in the fill-level measuring device 1, its sensor unit and the electronics module 12. These disturbing echoes 18 can show up with small attenuation as multireflection signals 13, even at greater distances—see FIG. 1. In the current evaluating methods, there is always the danger of interpreting such disturbance echo signals 18 or multiecho signals 13 incorrectly as wanted echo signals 15 from fill level F. According to the invention, with the help of an evaluation algorithm in the case of a fill-level measuring device 1 with known geometry, the reflection planes RP in the envelope curve 11, respectively the echo function 10, can be calculated. Therewith, echo signals 14 in the envelope curve 11, respectively the echo function 10, can be classified, according to their cause, measuring device- or container-specifically. Using a trial and error approach, echo signals in the envelope curve 11, respectively the echo function 10, are considered as potential multireflection echoes 13, or disturbance echo signals 18, of the coupling means 16, the antenna 17 and/or the electronics 13 and, through comparison with the calculated values of the evaluation algorithm, checked in this regard at the predetermined reflection planes RP. Only echo signals 14, which cannot be associated with this category, multiecho signals 13 and disturbance signals 18, can be considered as possible medium-specific, wanted echo signals 15 and are used for ascertaining fill level F in the container 5. In connection with dynamic plausibility considerations of the wanted echo signals 15 thus ascertained, there results a physically based evaluation algorithm, which manages completely without thresholds, e.g. first echo factor, and masking curves, which can vary over an extended measurement time, for example, due to formation of accretions.

This invention provides a completely new procedure for determining fill level F, by calculating the measuring device- and container-specific reflection planes RP in advance using the evaluation algorithm of the invention. These calculated reflection planes RP are taken into consideration for selecting the wanted echo in the echo function 10, respectively envelope curve, whereby the number of potential wanted echo signals 15 in the envelope curve 11, respectively echo function 10, is lessened.

FIG. 3 shows an example of a multireflection 13 on reflection planes RP. The possible different transmission paths and reflection paths of the measuring signals, respectively transmission signals S, in the measuring system are indicated by the arrows. Transmission signals S are produced in a high frequency module 12. Due to less than perfect impedance matchings in the module and/or with the coaxial conductor, there arises in this module a first reflection plane RP1 with an attenuation (damping) D1 of −10 decibel of the back reflected transmission signals S. In the coupling means 16, due to the mode transformation of the electromagnetic waves from a coaxial conductor system to a radiating element, respectively antenna element 17, by means of, for example, a coupling pin or a coupling stage, a second reflection plane RP2 with a damping of −20 decibel is produced. Another, third reflection plane RP 3 arises at the edge of the horn as antenna element 17 with an attenuation of the reflection signals by −50 decibel. The reflection on the interface 8 of the medium 7 produces a fourth reflection plane R24, which attenuates the measurement signal by −80 decibel.

The evaluation algorithm of the invention, from the input damping values D1, D2, D3, D4 and the separations, respectively distance values, dx1, dx2, dx3, dx4 of the reflection planes RP1, RP2, RP3, RP4, calculates all conceivable multiecho signals 13, respectively disturbance echo signals 18, in all possible transmission paths and reflection paths of the transmission signal S. The evaluation algorithm calculates by addition of the traveled distances, respectively distance values dx1, dx2, dx3, dx4, between the reflection planes RP1, RP2, RP3, RP4 traveled through, the reflection position XR of the conceivable multiechoes 13, respectively disturbing echoes 8. Furthermore, the evaluation algorithm calculates, in turn, by addition of the damping values D1, D2, D3, D4 of the measurement signal reflection at the reflection planes RP1, R22, RP3, RP4 traveled through, the reflection amplitude AR of the conceivable multireflection echoes 13. It is not always possible to determine the exact reflection amplitude AR and/or exact reflection position XR of the multiecho signals 13 and/or disturbance signals 18 calculated with the evaluation algorithm. Therefore, we determine a reflection region RR, which gives the reflection amplitude AR and/or reflection position XR with a predetermined variance, or deviation, or a variance, or deviation, calculated with the evaluation algorithm.

The transmission/reflection path of the transmission signal S made noticeable by the dot-dashed line shows an example for a possible multiecho signal 13 of FIG. 2. For the following example of calculation, basically an attenuation of the transmission signals T of about −1 decibel is assumed. At the first reflection plane RP1 of the high frequency module, the transmission signal S is transmitted with an attenuation of −1 decibel and it strikes, thus, on the second reflection plane RP2 of the coupling means 12, where this signal is reflected back with an attenuation of −20 decibel. The transmission signal S now already attenuated by −21 decibel is, in turn, reflected back at the first reflection plane RP1 with a first attenuation D1 of −10 decibel. This attenuated transmission signal S is transmitted through the second reflection plane RP2 and is radiated back with a third attenuation D3 of −50 decibel through the first and second reflection planes RP1, RP2 into the high frequency electronics 12, or transmitting/receiving unit 3. Received in the transmitting/receiving unit 3 now is a transmission signal S attenuated by about −84 decibel as multiecho 13, which has traveled on this transmission reflection path, as reflection separation XR of the reflection region RR, the sum of four times the first separation dx1 and twice the second separation dx2. The transmission signal S, which follows the direct transmission path through the reflection planes RP1 RP2, RP3 and, on the fourth reflection plane RP4, the interface 8 of the medium 7, is reflected back to high frequency electronics 12, respectively transmitting/receiving unit 3, is indicated by the dotted line in FIG. 3. The evaluation algorithm calculates for the transmission signal S, which is directly reflected on the interface 8 of the medium 7, an attenuation of about −86 decibel and, for the reflection position XR of the reflection region RR, twice the sum of the distances dx1, dx2 and dx3 of the reflection planes RP1, RP2, RP3, RP4.

The damping measures D1, D2, D3, D4 result from the reflection properties of the reflection planes RP, impedance matching characteristics at the reflection planes RP, the dielectric constant of the materials at the reflection planes RP and/or the separations dx to the next reflection planes RP. The damping measures D1, D2, D3 and the distances dx1, dx2 of the first to third reflection planes RP1, RP2 are ascertained by the manufacturer of the fill-level measuring device 1 in the course of manufacture and calibration and are stored in a memory element in the fill-level measuring device 1. Furthermore, an option is to use a test routine or a startup method such that the evaluation algorithm independently calculates and/or checks these attenuation measures D1, D2, D3 and distances dx1, dx2.

Figure 4:
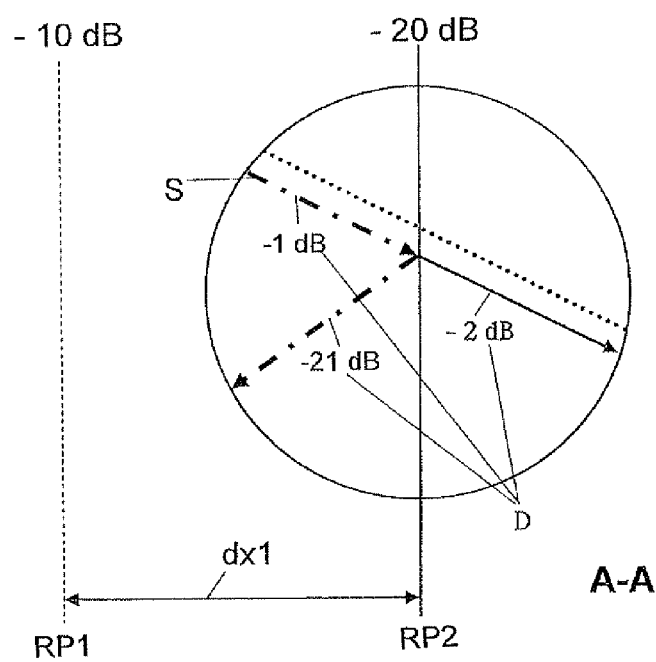
FIG. 4 is a section of a reflection plane in the measuring path of FIG. 3 with the representation of the transmission and reflection of the signals and their attenuations.

FIG. 4 shows an enlarged section from FIG. 3 of a reflection of the transmission signal S at the second reflection plane RP2. The transmission signal S attenuated by −1 decibel strikes the second reflection plane RP2 of the coupling means 16 and is reflected back with −21 decibel attenuation D2 and transmitted with −2 decibel.

Since the ascertained reflection regions RR with the associated reflection amplitudes AR and the reflection positions xR at the measuring device- and container-specific reflection planes RP are compared with the echo signals 14 in the echo function 10, respectively envelope curve 11, for example, a dynamic plausibility review is performed with the algorithm. If the values of the reflection amplitudes AR and the reflection positions of the calculated reflection region RR equal the values xR of the echo function 10, respectively envelope curve 11, then a multiecho signal 13 or disturbance echo signal 18 in the echo function 10, respectively envelope curve 11, has been unequivocally classified. All echo signals 14, which cannot be classified in the echo function 10, respectively envelope curve 11, by the evaluation algorithm unequivocally as multiecho signal 13 or disturbance echo signal 18, are potential wanted echo signals 15 and are then considered more exactly by means of a dynamic plausibility review or a dynamic search algorithm.

According to the invention, the position x1 of the wanted echo signal 15 is determined by means of a search algorithm. At this position x1, a dynamic echo search algorithm places a search window. This search window has a predetermined width and height and is so arranged that search for the echo signal or the wanted echo signal 15 can be in the two opposite directions starting from the position x1. Corresponding search algorithms for determining the wanted echo signal 15 are sufficiently disclosed in the state of the art, e.g. in DE 103 60 710 A1, DE 102 60 962 A1 and DE 198 245 267 A1, and are not explained further here.

Figure 5:
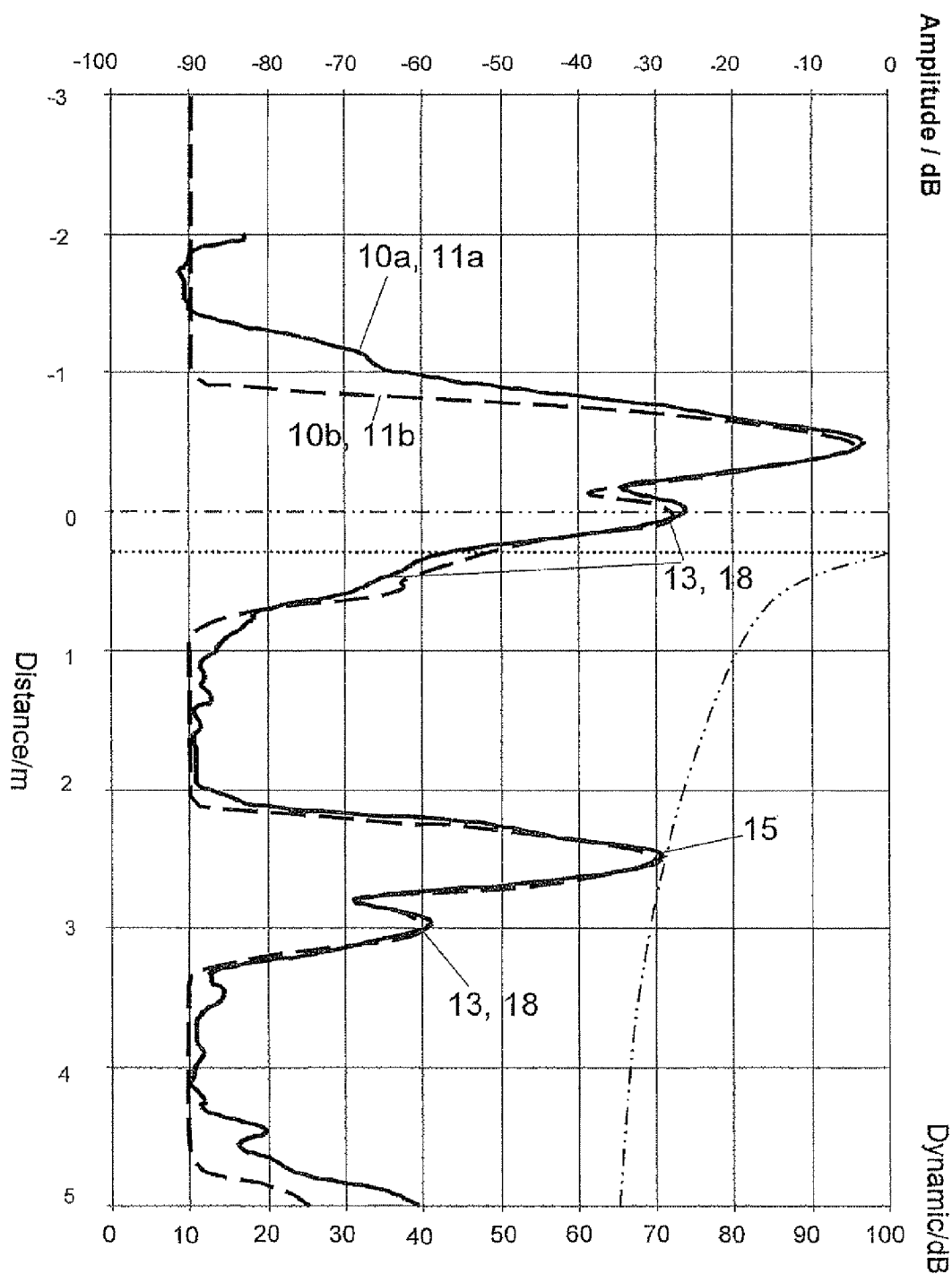
FIG. 5 is a graph of the calculated echo function with the evaluation algorithm of the invention and the measured echo function.

FIG. 5 shows a graph of the echo function 10b, respectively envelope curve 11b, as calculated with the evaluation algorithm of the invention, as well as showing the measured echo function 10a, respectively measured envelope curve 11a. The curve with the dashed line represents the envelope curve 11b calculated with the evaluation algorithm of the invention and the curve with the solid line the envelope curve 11a measured with a fill-level measuring device 1. It is easily recognizable that the two envelope curves 11a, 11b differ only slightly. It follows therefrom that the more exactly a manufacturer, respectively a user, of a fill-level measuring device 1 can specify the measuring device- and container-specific reflection planes RP and/or known geometries of the fill-level measuring device 1 for the evaluation algorithm of the invention, the better the evaluation algorithm can determine and calculate the disturbance echo signals 18 and multiecho signals 12 in the envelope curve 11, respectively echo function. Through evaluation, respectively difference forming, of the measured echo function 10a, respectively the measured envelope curve 11a, and the calculated echo function 10b, respectively the calculated envelope curves 11b, of disturbance reflections 18 and/or multiple reflections 13, covered wanted echo signals 15, which do not appear as separate echo signals 14 in the measured echo functions 10a, respectively measured envelope curve 11a, can be ascertained. This occurs, for example, by comparison of the measured envelope curve lie with the calculated envelope curves 11. In this way, wanted echo signals 15, which are covered by the disturbance echo signals 18 and multiecho signals 13 at the reflection positions XR of these reflection planes RP and, thus, not visible as separate echo signals (14) in the measured echo function 10a, respectively the measured envelope curve 11a, can be ascertained. An example of this is when the wanted echo signal 15 of fill level F is covered by ringing, respectively disturbance echo signal 18 of the horn antenna 17 at the third reflection plane RP3.

The invention claimed is:

1. A method for ascertaining and monitoring fill level of a medium in a container by means of a fill-level measuring device using a travel time measuring method, comprising the steps of:
   calculating measuring device- and container-specific reflection planes;
   transmitting transmission signals toward the medium and receiving reflection signals;
   registering the received reflection signals as echo signals in an echo function dependent on travel time or travel distance;
   calculating possible reflection regions in the echo function based on the measuring device- and container-specific reflection planes by means of an evaluation algorithm;
   classifying disturbance echo signals or multi-echo signals in the echo function based on the calculated reflection regions;
   ascertaining wanted echo signals of non-classified reflection signals by means of a search algorithm;
   determining fill level from a position or an amplitude of at least one wanted echo signal;
   calculating at least one reflection position or at least one reflection amplitude of the possible reflection regions in the echo function by means of the evaluation algorithm;
   determining the reflection positions of the reflection regions by the evaluation algorithm by registering distances of the measuring device- and container-specific reflection planes and calculating by addition of the distances of the reflection planes traveled through by the transmission signal;
   determining the reflection amplitudes of the reflection regions by the evaluation algorithm by registering attenuation measures of the measuring device- and container-specific reflection planes and calculating by addition of the attenuation measures of the reflection planes traveled through by the transmission signal; and
   outputting the measured value of fill level.

2. The method as claimed in claim 1, further comprising a step of:
   determining reflection positions of the reflection regions by the evaluation algorithm by earlier calculating all possible reflections and transmissions of the transmission signals at the reflection planes.

3. The method as claimed in claim 1, wherein the distances or attenuation measures of the measuring device- and container-specific reflection planes are input as measuring device or container dependent variables into the evaluation algorithm or ascertained in a startup method and stored.

4. The method as claimed in claim 1, further comprising a step of:
   performing a dynamic plausibility review by means of the algorithm by comparing the ascertained reflection regions with the associated reflection amplitudes and the reflection positions at the measuring device- and container-specific reflection planes with the echo signals in the echo function.

5. The method as claimed in claim 4, further comprising a step of:
   comparing the reflection amplitudes or reflection positions of a measuring device- and container-specific reflection plane are compared with a position or an amplitude of the echo signals, for the dynamic plausibility review.

6. The method as claimed in claim 1, further comprising a step of:
   registering the received reflection signals as echo signals in a measured echo function, or measured envelope curve; and
   registering based on measuring device- and container-specific reflection planes, possible reflection regions by means of an evaluation algorithm with the calculated echo function, or the calculated envelope curves.

7. The method as claimed in claim 6, further comprising a step of:
   ascertaining the wanted echo signals by difference forming of the measured echo function, or the measured envelope curve, with the calculated echo function, or the calculated envelope curves.

8. The method as claimed in claim 6, further comprising a step of:
   ascertaining by comparison of the measured echo function, or the measured envelope curve and the calculated echo function, or the calculated envelope curves, of disturbance reflections or multiple reflections, covered wanted echo signals, which do not appear as separate echo signals in the measured echo functions, or measured envelope curve.

* * * * *